May 6, 1969

C. S. ODSON 3,442,129

THERMOSTAT

Filed Dec. 18, 1967

INVENTOR.
CLIFFORD S. ODSON
BY
McNENNY, FARRINGTON,
PEARNE & GORDON
ATTORNEYS

United States Patent Office 3,442,129
Patented May 6, 1969

3,442,129
THERMOSTAT
Clifford S. Odson, Mansfield, Ohio, assignor to Therm-O-Disc, Incorporated, a corporation of Ohio, incorporated 1968
Filed Dec. 18, 1967, Ser. No. 691,602
Int. Cl. G01k 5/50
U.S. Cl. 73—363                               7 Claims

ABSTRACT OF THE DISCLOSURE

An adjustable thermostat provided with a range stop to selectively limit the range of adjustment of the thermostat. The range stop is positioned over the adjusting stem of the thermostat between the thermostat body and the indicator pointer. A peripheral notch fits around a fixed stop to orient the range stop. Two upstanding projections on the range stop are located to limit the range of adjustment of the thermostat. Each upstanding projection is frangibly connected to the range stop base so that the upstanding projections may be broken away to increase the range of adjustment of the thermostat.

Background of invention

Figure 1:
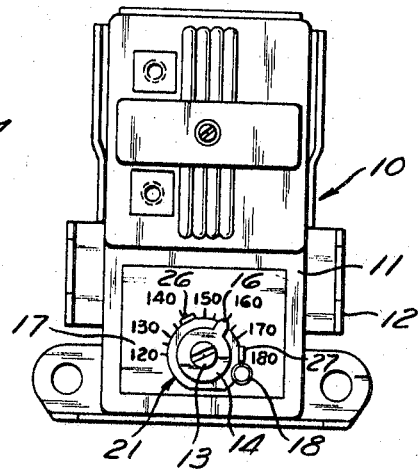

This invention relates generally to thermostats and more particularly to a novel and improved one-piece range stop for selectively providing a single thermostat with a variety of ranges of temperature adjustment.

In most thermostatically controlled systems it is desirable to limit the range of temperatures through which the thermostat may be adjusted. For example, water heater thermostats are often arranged so that the thermostat cannot be adjusted to operate above some predetermined temperature. This maximum temperature of adjustment is not the same for all water heaters. Normally electric hot water heaters, for example, are provided with thermostats adjustable to a maximum temperature of about 180° F. However, some models of electric hot water heaters, which are sold with extended period warranties are often provided with thermostats adjustable to a maximum temperature of about 170°. Similarly it is often desirable to provide a lower limit of adjustment in some hot water heater systems which differs materially from the lower adjustment limit of other systems.

Prior art

Generally the adjustment range for a given thermostat is determined at the time of its manufacture and such range cannot be conveniently changed. Therefore, it has normally been necessary to manufacture and stock separate models of a given thermostat for each range of adjustment required.

Summary of invention

The present invention provides an inexpensive and easily installed range stop or limit device for thermostats. In the illustrated embodiment the range stop is applied to a thermostat of the type disclosed and claimed in the United States Letters Patent 2,645,692 granted on July 14, 1953. The range stop is installed at the time of manufacture of the thermostat and in the illustrated embodiment limits the adjustment range of the thermostat to temperatures between 150° F. and 170° F. even though the full adjustment range of the basic thermostat is between 120° F. and 180° F.

The range stop is provided with two projections which extend up from the range stop base and are frangibly connected thereto. When the thermostat is installed on the water heater requiring a range of adjustment of 150° F. to 170° F., projections are left intact. However, when greater ranges of temperature adjustment are required, one or both of the projections are bent down until they break away. Therefore, a single model of thermostat may be selectively provided with four different ranges of temperature adjustment. In the illustrated embodiment of this invention these ranges of adjustment are from 150° F. to 170° F.; 150° F. to 180° F.; 120° F. to 170° F.; and 120° F. to 180° F.

This invention, therefore, allows the thermostat manufacturer to make and stock a single model thermostat which can be selectively provided with four different ranges of adjustment. This also provides the manufacture of the system, in which the thermostat is installed with savings since he can stock one model of thermostat instead of four models. Further this invention permits the system user to change the range of adjustment. However, when the system user of a system having an extended period warranty, based upon limited ranges of operating temperatures, removes one or both projections to increase the range of adjustment, such change is apparent to the system manufacturer in the event that a claim is made under the warranty.

In the particular embodiment illustrated, the thermostat is provided with a rotatable adjusting stem which projects from the thermostat body and carries an indicator pointer. Temperature adjustment is obtained by rotating the adjustment stem until the pointer is aligned with the desired temperature indicia on the body. A fixed stop is mounted on the body and is positioned to engage the pointer when the thermostat is adjusted to its maximum operating temperature of 180° F.

The range stop provides a washer-shaped base having a central opening which loosely fits over the adjusting stem. The range stop base is positioned between the thermostat body and the pointer and is provided with a peripheral notch proportioned to embrace the fixed stop. Therefore, the range stop is mounted and properly positioned by the adjusting stem, the fixed stop, the thermostat body, and the pointer; and separate fastening means are not required. A pair of upstanding projections extend from the range stop base and are positioned on opposite sides of the pointer. These projections are positioned to engage the pointer and limit the range of adjustment of the thermostat.

The two projections are joined to the base at a sharp bend which weakens the material at the bend. Therefore, when either projection is bent back to clear the pointer, the material at the bend ruptures and the projection separates from the range stop base.

Objects of invention

It is an important object of this invention to provide a novel and improved range stop for a thermostat which provides a single model of thermostat with a variety of ranges of operating temperatures.

It is another important object of this invention to provide a novel and improved range stop for a thermostat which provides a positive indication that extension of the operating range has occurred.

Figure 2:
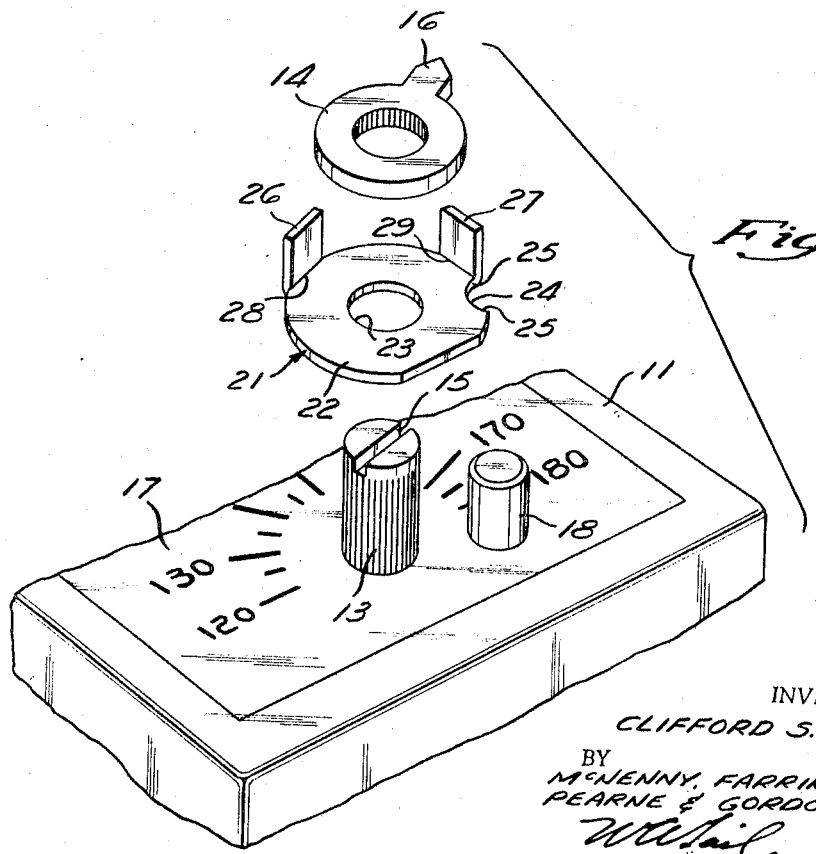

Further objects and advantges will appear from the following description and drawings wherein:

FIGURE 1 is a plan view of a thermostat incorporating the present invention; and, FIGURE 2 is an enlarged, exploded, perspective, fragmentary view illustrating the structure of the range stop and the related portions of the thermostat.

Referring to the drawings, the thermostat 10 includes a body 11 connected to a metallic mounting bracket 12. This thermostat is particularly adapted for use with electric hot water heaters, and the like, and is provided with a bimetallic actuating element which operates a switching mechanism in response to temperature changes in the hot water heater. The structural detail of this thermostat is disclosed in the United States Letters Patent cited above and reference may be made to that patent for a clear understanding of the structure and operation of the thermostat itself.

Projecting upwardly from the face of the thermostat is an adjusting stem 13 which is mounted for rotation in the body to provide the adjustment of the thermostat operating temperature. An indicator member 14 provides with a pointer 16 is press-fitted onto the adjusting stem 13. The stem 13 and indicator 14 may be knurled to prevent relative movement. Temperature indicia 17 is provided on the body 11 to cooperate with the pointer 16 to indicate the particular operating temperature at which the thermostat is set. For example when the thermostat is set as illustrated in FIGURE 1, it operates at a temperature of about 160° F. The stem is provided with an end slot 15 to facilitate adjustment.

A fixed cylindrical stop 18 is mounted on the body to one side of the adjusting stem 13 and is located so that the thermostat is adjusted to operate 180° F. when the pointer projection 16 engages the fixed stop 18.

The thermostat is provided with a metal range stop 21, best illustrated in FIGURE 2, which is provided with a washer-shaped base 22 having a central opening 23 adapted to fit with clearance over the adjusting stem 13. The base 22 is formed with a peripheral notch 24 providing opposed radially extending surfaces 25 proportioned to engage opposite sides of the fixed stop 18 and correctly orient the range stop 21. During assembly of the thermostat the range stop 21 is positioned over the adjusting stem 13 with the fixed stop 18 in the notch 24 before the pointer 14 is assembled onto the adjusting stem. The range stop is, therefore, correctly positioned and oriented with respect to the thermostat body.

The range stop 21 is provided with two upstanding projections 26 and 27 which are joined to the range stop base 22 at sharp bends 28 and 29 respectively. The material of the range stop is weakened by forming the sharp bends 28 and 29 so that a frangible connection is provided between each projection and the base 22. Consequently when either of the projections 26 or 27 are bent down into the plane of the base 22, the material forming the bends 28 or 29 ruptures and the projection breaks away from the base.

The pointer 14 is assembled onto the adjusting stem 13 after the range stop is in position with its projection 16 located between the two projections 26 and 27. The pointer cooperates with the body 11 to axially position the range stop and complete the mounting thereof. Because the range stop is loosely received between the pointer 14 and the body 11 and loosely fits over the adjusting stem 13, it does not in any way adversely affect the calibration accuracy of the thermostat.

The projection 27 is adjacent to the stop 18 and the two projections 26 and 27 are located so that the projection 16 of the pointer 14 engages the projection 26 when the thermostat is adjusted to 150° F. and the pointer projection 16 engages the projection 27 when the thermostat is adjusted to 170° F. Therefore, when both projections are in place, the range of adjustment of the thermostat is between 150° F. and 170° F.

When the purchaser of the thermostat or the user of the system in which the thermostat is installed desires to change the range of adjustment, it is a simple matter to bend the selected projection 26 or 27 down until it breaks away. When the projection 27 is removed, the adjusting range is increased in the illustrated embodiment to 180° since the pointer is then free to rotate until the projection 16 engages the fixed stop 18. Similarly when the projection 26 is broken away, the thermostat can be adjusted down to its lower limit of adjustment of 120° F. Consequently this simple range stop permits a thermostat to be selectively provided with four different ranges of adjustment as mentioned above.

Although a preferred embodiment of this invention is illustrated, it is to be understood that various modifications and rearrangements of parts may be resorted to without departing from the scope of the invention.

What is claimed is:

1. A thermostat comprising a body, an adjusting stem member journaled in said body, a fixed stop member mounted on said body adjacent to said stem member, an indicator mounted on said stem for rotation therewith, rotation of said stem and indicator adjusting the operating temperature of said thermostat through a normal range of temperature adjustment between normal maximum and normal minimum operating temperature limits, said indicator being provided with a radially extending projection proportioned to engage said fixed stop member and limit rotation of said stem member when said thermostat is adjusted to operate at one of said operating temperature limits, and a range stop providing a base formed with an opening fitting over one of said members and opposed radially extending surfaces engaging opposite sides of the other of said members whereby said range stop is positioned by said members against any substantial movement along the face of said body, said range stop providing an upstanding projection engageable with said radially extending projection of said indicator to limit rotaton of said stem member and the range of adjustment of said thermostat to a range less than said normal range.

2. A thermostat as set forth in claim 1 wherein said opening of said range stop base is positioned over said stem member.

3. A thermostat as set forth in claim 2 wherein said range stop is positioned between said body and indicator, said body and indicator cooperating to prevent movement of said range stop along said stem member.

4. A thermostat as set forth in claim 1 wherein said one operating temperature limit is the maximum operating temperature limit, and said upstanding projection is positioned adjacent to said fixed stop member, said upstanding projection limiting the maximum temperature of adjustment of said thermostat.

5. A thermostat as set forth in claim 4 wherein said upstanding projection is frangibly connected to said base.

6. A thermostat as set forth in claim 1 wherein two upstanding projections are provided on said range stop, and said radially extending projection is positioned between said upstanding projections.

7. A thermostat as set forth in claim 6 wherein said upstanding projections are frangibly connected to said base.

References Cited

UNITED STATES PATENTS

| | | |
|---|---|---|
| 1,397,518 | 11/1921 | Hem. |
| 2,457,286 | 12/1948 | Tollefsen et al. |
| 2,640,130 | 5/1953 | Reingruber et al. _____ 73—363 |

LOUIS R. PRINCE, *Primary Examiner.*

W. A. HENRY, II, *Assistant Examiner.*

U.S. Cl. X.R.

116—129